United States Patent
Yamamoto et al.

[11] Patent Number: 5,356,691
[45] Date of Patent: Oct. 18, 1994

[54] FLEXIBLE COMPOSITE SHEET FOR ELECTRIC INSULATION

[75] Inventors: Koji Yamamoto; Kazuhisa Fujisawa, both of Kobe, Japan

[73] Assignee: Kabushiki Kaisha Kobe Seiko Sho, Kobe, Japan

[21] Appl. No.: 953,838

[22] Filed: Sep. 30, 1992

[30] Foreign Application Priority Data

Sep. 30, 1991 [JP] Japan .................. 3-280431
Oct. 29, 1991 [JP] Japan .................. 3-311981

[51] Int. Cl.⁵ .................................. B32B 5/08
[52] U.S. Cl. .................... 428/112; 428/209; 528/112
[58] Field of Search ............ 428/209, 112; 528/112

[56] References Cited

U.S. PATENT DOCUMENTS 4,997,702  3/1991  Gazit et al. .................. 428/209

Primary Examiner—Melvyn I. Marquis
Assistant Examiner—D. Aylward
Attorney, Agent, or Firm—Oblon, Spivak, McClelland, Maier & Neustadt

[57] ABSTRACT

An electric insulation composite sheet excelled in flexibility as well as heat resistance, crack resistance, antihygroscopicity and insulation property comprising as essential components epoxy compound 150–300 g/eq in epoxy equivalent, hardener consisting essentially of polycarboxylic acid polyanhydride represented by the following general formula [1]

$$HO {+} \underset{\underset{O}{\|}}{C} {+} CH_2 {\underset{m}{\rightarrow}} \underset{\underset{O}{\|}}{C} - O {\underset{n}{\rightarrow}} H \quad [1]$$

and a reinforcing fiber.

7 Claims, No Drawings

FLEXIBLE COMPOSITE SHEET FOR ELECTRIC INSULATION

BACKGROUND OF THE INVENTION

1. Field of the Invention

The present invention relates to a composite sheet for electric insulation using as matrix material an epoxy type resin composite which hardens to form a sheet excelled in flexibility, cracking resistance, antihygroscopicity and electric insulation property, and this composite sheet for electric insulation is useful as an insulation material for use in dry transformers, motors, generators and the like.

2. Description of the Related Art

Epoxy type resins with their high mechanical strength, excellent heat resistance and electric insulation property are widely used as molding materials for electric and electronic parts/components and the like. Ordinary epoxy resin, however, generally lack in flexibility and less suited as materials for films and sheets.

Meanwhile, as a sheet material for electric insulation there is known a product, "Nomex" by trade name, marketed by DuPont. This sheet material, being short-length fibers based on meta-aramid polymer of the following structural formula

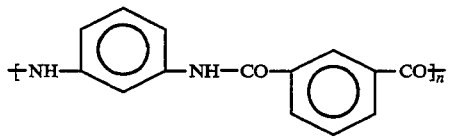

filtered and formed paper-like having an excellent heat resistance, electric insulation and mechanical strength and is being widely used as heat resistant insulation sheet.

This insulation sheet has, besides its extremely high cost, drawbacks of being hygroscopic and its electric insulation property being lowered after a relatively short period of use. Worse, made by filtering short-length fibers, the sheet has therein countless interfiber voids, this interfering with the material's electric insulation property, and has something to be desired about its dielectric breakdown strength.

The present invention has been made in view of such situation and is aimed at provision of a composite sheet excelled in anti-hygroscopicity, heat resistance, flexibility and electric insulation property having as its matrix component an epoxy-type resin composite which affords a polymer excelled in heat resistance, insulation property, anti-hygroscopicity et cetera and also in flexibility.

SUMMARY OF THE INVENTION

An electric insulation composite sheet the present invention capable of solving the aforementioned problems relates to is characterized in that it comprises an epoxy compound 150–300 g/eq in epoxy equivalent, a hardener based on polycarboxylic acid polyanhydride represented by the following general formula [I]

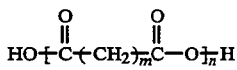

[1]

and a reinforcing fiber.

In the aforementioned composite sheet it is preferred to use as epoxy compound epoxy resin of bisphenol A-type or of F-type or of phenol novolac type, particularly preferred being epoxy compound having two or more glycidyl group in its molecule.

The preferred mixing ratio of the epoxy compound to the hardener is in a range of 30–200 weight parts of the hardener to 100 weight parts of the epoxy compound and the preferred composite ratio of the reinforcing fiber is in a range of 10–90 weight % of the weight of the composite sheet.

DESCRIPTION OF THE PREFERRED EMBODIMENT

As described above, it is one of the features of the present invention that an epoxy compound 150–300 g/eq in epoxy equivalent is used and that as its hardener is used a particular polycarboxylic polyanhydride represented by the aforementioned general formula [1]. The aforementioned polycarboxylic acid polyanhydride imparts flexibility to the polymer and the use of epoxy compound with the specified epoxy equivalent raises the crosslinking density and by combining this epoxy resin composite with the reinforcing fiber as matrix component an electric insulation composite sheet having all the required properties such as flexibility, heat resistance and anti-hygroscopicity is obtainable.

That in the present invention the epoxy equivalent of the epoxy compound is set at 150–300 g/eq is because, if it is not more than 150 g/eq, a large amount of the hardener is required for progress of hardening reaction, this resulting in lack of heat resistance of the polymer, while, if it should be in excess of 300 g/eq, the resin composite before hardening becomes highly viscous, this resulting in marked lowering of the impregnating ability thereof when i t combines therewith and the composite sheet having therein voids which interfere with its strength and flexibility.

As epoxy compounds meeting these requirements are cited, among others, epoxy resins of bisphenol A type, of hisphenol F type, of bisphenol S type, of resorcinol type, of hexahydrobisphenol A type, of phenol novolac type, of cresol novolac type, polypropylene glycol diglycidyl ester, phthalic diglycidyl ester and bisphenol hexachloroacetone diglycidyl ester. Of these, particularly preferred are epoxy resins of bisphenol A type, bisphenol F type and phenol novolac type.

These may be used either alone or, if necessary, in combination of two or more.

When these epoxy compounds are used in combination of two or more, it is necessary to adjust their quantities so that the mean value of their epoxy equivalents is within a range of 150–300 g/eq. Also, of these epoxy compounds, it is necessary to select those having two or preferably more than two glycidyl groups in one molecule so as to raise the polymer's crosslinking density for securing a sufficient heat resistance.

As bisphenol A-type epoxy resin may be cited, for example, Dow Chemical Japan, Ltd's "DER 331" Ciba Geigy's "GY 260" "GY 280" Yuka Shell Epoxy's "Epicoat 828"; as bisphenol F-type epoxy resin may be cited, for example, Yuka Shell Epoxy's "Epicoat 807"; and as phenol novolac type epoxy resin may be cited, for example, Dow Chemical Japan Ltd. 's Chemical's "DEN 431" and "DEN 438".

Polycarboxylic polyanhydride of the general formula [1] above acts as hardener on epoxy compound and also imparts to the polymer flexibility through increasing the bridge formation ratio. Since, if m and n in the above formula [1] are too large, the strength of the polymer becomes insufficient, while, if they are too small, the flexibility of the polymer is bound to become insufficient, hence the material to be chosen is required to be at least $m=8$–$20$ and $n=2$–$20$ and preferably $m=6$–$18$ and $n=4$–$18$.

As polycarboxylic acid polyanhydrides meeting such requirements are cited, polyanhydride, polyazelaic polyanhydride, polysebasic polyanhydride, polyeicosanedionic polyanhydride and polydodecanedionic polyanhydride and two or more of these are possibly usable in combination.

In the present invention, it is possible to use together with the aforementioned polycarboxylic acid polyanhydride acid anhydride-type hardener such as phthalic anhydride, tetrahydrophthal icanhydride, hexahydrophthalic anhydride, methyl nadicanhydride, dodecenylsuccinic anhydride and chlorendic anhydride or a proper amount of hardening accelerator (approx. 0.1–5 weight parts per 100 weight parts of polycarboxylic acid polyanhydride), for examples, tertiary amines such as N, N-benzyl dimethyl amine, 2,4,6-tris (dimethylaminomethyl) phenol, 1,8-diazobicyclo (5,4,0) undecene and imidazoles such as 2-methyl imidazole, 2-ethyl-4-methyl imidazole, 1- benzyl-2-methyl imidazole, 1 -cyanoethyl-2-methyl imidazole and 2-methyl imidazole isocyanuric acid adduct.

Although it is not proper to determine the preferred ratio of the quantity used of the aforementioned epoxy compound to that of polycarboxylic acid polyanhydride for it depends on the kind of epoxy compound, the properties required of the hardener or the hardening conditions, the standard quantity used is 0.8–1.0 of the stoichiometric amount calculated from the acid anhydride equivalent of polycarboxylic acid polyanhydride, preferably a range of 0.85–0.9, or in terms of weight ratio, 30–200 weight parts, preferably 50–150 weight parts of, of polycarboxylic acid polyanhydride per 100 weight parts of epoxy compound.

The electric insulation composite sheet of the present invention is what is further improved the physical property, mechanical strength and flexibility in particular through combination of reinforcing fiber/s and as reinforced fiber can be used inorganic fibers such as glass fiber, asbestos fiber and organic fibers such as polyamide fiber, polyamideimide fiber, aramid fiber, polyester fiber, polyphenylene sulfite fiber and polystyrene fiber alone or in combination of two or more. These are usable in combination as short-length fibers but for more effective exhibition of their reinforcing effect it is advisable to use their long fibers in mat form or as woven, knitted fabric or non-woven fabric.

The composite ratio of reinforcing fibers to epoxy resin composition ( sum of epoxy compound, hardener et cetera) is not particularly limited and may be properly selected according to the intended use, required properties et cetera but preferred to be in 10–90 weight more preferably 20–80 weight % of the total amount of composite sheet.

Although the electric insulation composite sheet of the present invention contains as essential components epoxy compound and the specific polycarboxylic acid polyanhydride and reinforcing fibers as mentioned above, it is of course possible to add such other components as hardening accelerator, oxidation inhibitor, colorant, palsticizer, inorganic filler, organic filler and internal release agent according to the intended use of the composite sheet or the properties required thereof.

There is no particular limitation either about the method of mixing the aforementioned materials but, since the polycarbonic acid polyanhydride-type hardener is solid at the normal temperature and the mixture thereof with epoxy compound is highly viscous at the normal temperature, it is difficult to mix it with a reinforcing fiber uniformly and void-free. Hence it is advisable to pre-heat the mixture of the hardener with the epoxy compound to above the melting point of the hardener (normally approx. 80° C. or above) and increase its fluidity before impregnating the reinforcing fiber therewith or dilute it properly with an inert organic solvent such as ketones, glycol ethers, hydrocarbons and chlorinated hydrocarbons or the like before impregnation therewith.

The hardening conditions after impregnation are not limited either and the optimum conditions may be selected case by case according to the kind of or the mixing ratio of epoxy compound and hardener but normally be in a range of 60°–200° C. and 0.6–72 hours. If proper pressure may be applied by a press or the like during hardening reaction, epoxy resin or the like penetrates into the voids in the reinforcing fiber more surely and the void-free high performance sheet-shaped polymer is easy to obtain.

EXAMPLE

Although examples are given below for specific description of the present invention, it is needless to say that the invention is not limited by any of such examples. The performance appreciation method applied in the following examples is as follows.

EXAMPLE 1

100g of Dow Chemical Japan Ltd.'s Bisphenol A-type epoxy resin (trade name: "DER 331")(epoxy equivalent: 190 g/eq) and 96 g of Okamura Oil Mill, Ltd.'s polydodecanedionic polyanhydride (trade marne: "SL-12AH") were put in a beaker and were uniformly mixed at 100° C. This mixture was impregnated in Oribest Co., Ltd. 's glass fiber ( trade name: "Glabest SBP") subdivided in A-4 size, and was heated for 2 hours at 200° C. being pressed at 50kg/cm2 by Yasuda Seiki's 10 ton small press and an electric insulation composite sheet 180 μm in thickness was thus obtained.

EXAMPLE 2

Melting and mixing, impregnation, pressing and heating were carried out in the same way as Example 1 except that 0.5 g of 2-ethyl-4-methylimidazol was used as hardening accelerator and an electric insulation composite sheet 180 μm in thickness was obtained.

EXAMPLE 3

Melting and mixing, impregnation, pressing and heating were carried out in the same way as Example 1 except that Dow Chemical Japan Ltd.'s phenol novolac-type epoxy resin (trade name: "DEN 431") (epoxy equivalent: 178 g/eq) was used and the dosage of the hardener was changed to 103 g and an electric insulation composite sheet 180 μm in thickness was obtained.

EXAMPLE 4

Melting and mixing, impregnation, pressing and heating were carried out in the same way as Example 1 except that Okamura Oil Mill, Ltd.'s polyeicosenedionic polyanhydride (trade name: "SL-20AH") was used and the dosage of the hardener was changed to 132 g and an electric insulation composite sheet 180 μm in thickness was obtained.

EXAMPLE 5

Melting and mixing, impregnation, pressing and heating were carried out in the same way as Example 1 except that Yuka Shell Epoxy's bisphenol F-type epoxy resin (trade name: "Epicoat 807") (epoxy equivalent: 174 g/eq) was used and the dosage of the hardener was changed to 105 g and an electric insulation composite sheet 180 μm in thickness was obtained.

Comparative Example 1

Melting and mixing, impregnation, pressing and heating were carried out in the same way as Example 1 except that Yuka Shell Epoxy's bisphenol A-type epoxy resin (trade name; "Epicoat 1004") (epoxy equivalent: 810 g/eq) was used and the dosage of hardener was changed to 23 g and a composite sheet 180μm in thickness was obtained.

Comparative Example 3

Melting and mixing, impregnation, pressing and heating were carried out in the same way as Example 1 except that the dosage of the hardener was changed to 27 g of diaminodiphenyl methane (DDM) and a composite sheet 180 μm in thickness was obtained.

Comparative Example 4

Melting and mixing, impregnation and pressing and heating were carried out in the same way as Example 1 except that the dosage of the hardener was changed to 98 g of methylnadic acid anhydride (MNA) and a composite sheet 180 μm in thickness was obtained.

With the composite sheets so obtained MIT bending test (JIS P 8115) and dielectric breakdown strength test (ASTM D 149) were carried out and the results were as shown in Table 1.

epoxy equivalent is too large, those of Comparative Example 3 and 4 are inadequate in the choice of hardener, all of these, therefore, extremely poor in flexibility as well as electric insulation property. The heat resistance of the composite sheets of Examples 1–5 [Thermal decomposition starting temperature: Measurement is taken by the use of Perkin Elmer's thermogravimetric analyzer (trade name: "TGA 7") in a nitrogen atmosphere at a heating rate of 10° C./min. and it is taken as the temperature at which the loss in weight determined by thermogravimetric measurement is 5%.] was invariably not less than 350° C., this being very good.

In the present invention, whose composition is as described above, a multifunctional epoxy compound 150–300 g/eq in epoxy equivalent is used as epoxy compound and a specific polycarbonic acid polyanhydride as hardener and combining it with a reinforcing fiber an excellent electric insulation composite sheet excellent in physical strength, flexibility and heat resistance as well as in electric insulation property is obtainable. Moreover, this composite sheet is excellent in anti-hygroscopicity and there is no risk of insulation property being aggravated due to hygroscopicity as with known meta-aromatic aramid-type polymer.

We claim:

1. An electric insulation composite sheet having excellent heat resistance and flexibility, comprising a multifunctional epoxy resin having an epoxy equivalent of 150–300 g/eq, a polyanhydride hardener having the formula

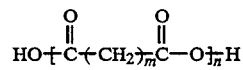

wherein m is an integer of 10–20 and n is an integer of 2–20, and a reinforcing fiber.

2. The electric insulation composite sheet having excellent heat resistance and flexibility according to claim 1, wherein said epoxy compound is at least one of bisphenol A-type epoxy compound, bisphenol F-type epoxy resin, bisphenol S-type epoxy resin and phenol novolac type epoxy resin.

3. The electric insulation composite sheet having excellent heat resistance and flexibility according to

TABLE 1

| | Example | | | | | Comparative Example | | | |
|---|---|---|---|---|---|---|---|---|---|
| | 1 | 2 | 3 | 4 | 5 | 1 | 2 | 3 | 4 |
| Epoxy resin (g) | DER 331 (100) | DER 331 (100) | DEN 431 (100) | DER 331 (100) | EPICOAT 807 (100) | EPICOAT 604 (100) | EPICOAT 1004 (100) | DER 331 (100) | DER 331 (100) |
| Hardener (g) | SL-12AH (96) | SL-12AH (96) | SL-12AH (103) | SL-20AH (132) | SL-12AH (105) | SL-12AH (151) | SL-12AH (23) | DDM (27) | MNA (93) |
| Hardening accelerator | — | 2-ethyl-4-methyl-imidazol (0.5) | — | — | — | — | — | — | — |
| Physical properties of conjugate sheet | | | | | | | | | |
| No. of bends until failure | >20 | >20 | >20 | >20 | >20 | 1 | 3 | 1 | 1 |
| Dielectric breakdown strength (KV/mm) | 66.2 | 64.9 | 60.7 | 59.1 | 57.5 | 55.4 | 59.1 | 20.5 | 49.5 |

As is apparent from Table 1, all of the composite sheets of Examples 1–5 meeting the requirements of the present invention have excellent flexibility and electric insulation property. Of the composite sheets of Comparative Examples, that of Comparative Example 1 is of epoxy resin less than 150 g/eq in epoxy equivalent, that of Comparative Example 2 is of epoxy resin whose claim 1, wherein said epoxy compound comprises more than one glycidyl group in its molecule.

4. The electric insulation composite sheet having excellent heat resistance and flexibility according to claim 1, wherein said epoxy compound is mixed with 30–200 weight parts of hardener per 100 weight parts thereof.

5. The electric insulation composite sheet having excellent heat resistance and flexibility according to claim 1, wherein the content of reinforcing fiber in total weight of said composite sheet is 10–90 weight %.

6. The electric insulation composite having excellent heat resistance and flexibility according to claim 1, wherein said polyanhydride hardener is polyeicosanedionic polyanhydride.

7. The electric insulation composite sheet having excellent heat resistance and flexibility according to claim 1, wherein said polyanhydride hardener is polydodecanedionic polyanhydride.

* * * * *